(12) United States Patent
Knol

(10) Patent No.: US 10,619,693 B2
(45) Date of Patent: Apr. 14, 2020

(54) COMPENSATOR DEVICE

(71) Applicant: IHC Holland IE B.V., Sliedrecht (NL)

(72) Inventor: Albertus Knol, Numansdorp (NL)

(73) Assignee: IHC Holland IE B.V., Sliedrecht (NL)

( * ) Notice: Subject to any disclaimer, the term of this patent is extended or adjusted under 35 U.S.C. 154(b) by 242 days.

(21) Appl. No.: 15/546,285

(22) PCT Filed: Jan. 28, 2016

(86) PCT No.: PCT/NL2016/050066
§ 371 (c)(1),
(2) Date: Jul. 26, 2017

(87) PCT Pub. No.: WO2016/122321
PCT Pub. Date: Aug. 4, 2016

(65) Prior Publication Data
US 2018/0003257 A1 Jan. 4, 2018

(30) Foreign Application Priority Data

Jan. 29, 2015 (NL) ...................................... 2014212

(51) Int. Cl.
| *F16F 9/18* | (2006.01) |
| *F15B 11/08* | (2006.01) |
| *F16B 13/04* | (2006.01) |
| *F16F 9/43* | (2006.01) |
| *B66D 1/52* | (2006.01) |
| *E02F 9/06* | (2006.01) |
| *E02F 9/22* | (2006.01) |

(Continued)

(52) U.S. Cl.
CPC ................ *F16F 9/182* (2013.01); *B66D 1/52* (2013.01); *E02F 9/067* (2013.01); *E02F 9/2217* (2013.01); *E02F 9/2271* (2013.01); *F15B 1/26* (2013.01); *F15B 11/08* (2013.01); *F15B 13/0401* (2013.01); *F16F 9/435* (2013.01); *E21B 19/006* (2013.01); *F15B 2211/7053* (2013.01)

(58) Field of Classification Search
CPC ......... E21B 19/006; E21B 19/09; B66D 1/52; E02F 9/067; F16F 9/182; F16F 9/435; F16F 9/432; F15B 15/1466; F15B 15/224; F15B 21/006
USPC ........................ 92/109, 110, 111, 112; 91/26
See application file for complete search history.

(56) References Cited

U.S. PATENT DOCUMENTS 2,193,736 A * 3/1940 Onions ................... F01B 17/00
92/108
3,335,642 A * 8/1967 Rosaen ............... F15B 15/1466
92/110

(Continued)

FOREIGN PATENT DOCUMENTS

| CN | 101798909 A | 8/2010 |
| CN | 102943636 A | 2/2013 |
| EP | 1731792 A1 | 12/2006 |

*Primary Examiner* — Michael Leslie
*Assistant Examiner* — Dustin T Nguyen
(74) *Attorney, Agent, or Firm* — N.V. Nederlandsch Octrooibureau; Catherine A. Shultz; Tamara C. Stegmann

(57) ABSTRACT

A compensator device includes a hydraulic cylinder with a first end, a second end and an inner cylinder rod extending axially from the second end; and a piston rod with a piston movable axially within the cylinder. The inner cylinder rod has an end with a blocking diameter. The piston rod is generally hollow and includes a cavity to receive the blocking diameter of the inner cylinder rod.

11 Claims, 3 Drawing Sheets

(51) Int. Cl.
*F15B 1/26* (2006.01)
*F15B 13/04* (2006.01)
*E21B 19/00* (2006.01)

(56) References Cited

U.S. PATENT DOCUMENTS

| | | | |
|---|---|---|---|
| 3,592,108 A * | 7/1971 | Rosaen | F15B 11/024 |
| | | | 91/422 |
| 3,804,183 A | 4/1974 | Duncan et al. | |
| 3,912,227 A | 10/1975 | Meeker et al. | |
| 4,098,491 A * | 7/1978 | Larralde | E21B 19/09 |
| | | | 254/277 |
| 4,268,013 A | 5/1981 | Khan | |
| 5,784,943 A * | 7/1998 | Kahra | E04G 23/08 |
| | | | 91/28 |
| 2014/0230645 A1* | 8/2014 | Bauer | F16F 9/365 |
| | | | 92/109 |

* cited by examiner

Fig. 1 - Prior Art -

COMPENSATOR DEVICE

BACKGROUND

Swell compensator systems or wire tensioners on a trailing suction hopper dredger or other applications operate to reduce or eliminate overloadings which may be caused by swell due to heave motions of a wave. A typical swell compensator system is shown in FIG. 1 and uses a hydraulic system connected between a winch 12 and a load 14 it is carrying. The hydraulic system consists of a hydraulic cylinder 16 that keeps the wire rope 18 between winch 12 and load 14 taut. Hydraulic cylinder 16 is in fluid communication with a pressure vessel 20 that, in addition to the hydraulic fluid, contains air that acts as a gas spring. The hydraulic cylinder 16 serves to compensate for the motion of the waves, keeping the load 14 steady, and in the case of a trailing suction hopper dredger in FIG. 1, keeping the draghead in the correct position for a dredging operation. In some cases, a pressure vessel with medium separator between the hydraulic fluid and gas is used. When a medium separator is used, the gas used can be, for example, nitrogen instead of air.

If the wire 18 in the system breaks, cylinder 16 in the hydraulic system will extend at high speed due to the gas pressure, and this can damage cylinder 16 and/or connected equipment. Past systems dealt with this in two basic ways. The first way was using a high speed (proportional) valve 22 to block flow to the cylinder. However, such a system poses high demands on the components and the control system. The detection of wire failure and acting on it must happen very quickly, in a matter of milliseconds, for such a system to be effective. Additionally, blocking flow to cylinder 16 does not necessarily stop the movement of cylinder 16. Cylinder 16 may simply draw a vacuum die to the inertia of the rod and sheave block. The second option is to use a cushioning device on the rod side of the system. This is an inherent safety measure, but it only works properly if there is absolutely no air in cylinder 16, which may be hard to achieve, especially in systems without a medium separator.

SUMMARY

According to a first aspect of the invention, a compensator device includes a hydraulic cylinder with a first end, a second end and an inner cylinder rod extending axially from the second end; and a piston rod with a piston movable axially within the cylinder. The inner cylinder rod has an end with a blocking diameter. The piston rod is generally hollow and includes a cavity to receive the blocking diameter of the inner cylinder rod.

Such a compensator device can allow for higher force on the inner cylinder rod as the blocking diameter and thus the blocking area is larger than the compensation pressure area. Thus, higher pressures can be used without increasing the risk of damage to the equipment and a smaller installation is possible.

According to an embodiment, a first pressure chamber is formed in the hollow cavity of the piston rod between the piston, the inner cylinder rod and an inner side of the piston rod; a second pressure chamber is formed between an inner side of the cylinder at the second end and the piston; and a third pressure chamber is formed between the inner side of the cylinder at the first end, the outer side of the piston rod and the piston.

According to an embodiment, the compensator device further comprises an inlet valve in fluid communication with the first pressure chamber and positioned to be selectively covered by the piston when the piston moves toward the second end of the cylinder; an outlet valve in fluid communication with the first pressure chamber for allowing fluid to exit the first pressure chamber; a fluid passage connecting to the third pressure chamber; and a pressure system to selectively provide pressurized fluid to the hydraulic system for influencing movement of the piston rod and piston axially with respect to the cylinder. The placement of the inlet valve so that it is selectively covered by the piston when the piston moves toward the first end of the cylinder allows for the automatic and quick throttling down of the flow to the first pressure chamber upon the occurrence of a high speed, for example, due to a wire breaking. Additionally, by delivering pressurized fluid to first and third pressure chambers, the pressure in third pressure chamber can work to stop sudden and quick movements of the piston towards the first end of hydraulic cylinder.

According to an embodiment, the pressure system includes a pressure vessel connected to the first pressure chamber and the third pressure chamber for selectively providing a pressurized fluid to the first pressure chamber and/or the third pressure chamber.

According to an embodiment, the inlet valve and the outlet valves are one-direction valves.

According to an embodiment, the compensator device further comprises a valve which can prevent inward movement of the inner cylinder. This can be used to block the compensator device when compensation is not desired, for example, when a draghead must be lifted quickly.

According to an embodiment, the compensator device further comprises a flow passage in the piston extending from the first pressure chamber to the second pressure chamber. This embodiment can be used in a compensator device where buckling is not an issue, for example in a larger compensator device. In such an embodiment, the full bore surface is used for blocking and the full rod surface is used for compensation.

According to an embodiment, a swell compensation system includes a compensator device.

According to a second aspect of the invention, a method of forming a compensator device includes forming a hydraulic cylinder with a first end and a second end; forming an inner cylinder rod with an end with a blocking area, the inner cylinder rod being formed to extend axially within the hydraulic cylinder from the second end;

forming a piston rod and piston, the piston rod with a generally hollow interior and with a cavity to receive the blocking area of the inner cylinder rod; and connecting the piston rod and piston through the first end of the hydraulic cylinder so that it can move axially in the hydraulic cylinder.

According to an embodiment, the method further comprises forming an inlet and an outlet in fluid communication with the hollow interior of the piston rod, the inlet positioned such that the piston will cover the inlet when it has move a certain distance toward the first end of the hydraulic cylinder.

According to an embodiment, the method further comprises connecting a pressurization system to the inlet to selectively provide pressurized fluid to the inlet; and connecting the pressurization system to a pressure chamber formed between an inner side of the hydraulic cylinder first end, an outer side of the piston rod and the piston.

According to an embodiment, the method further comprises forming a fluid passage through the piston between the hollow interior of the piston rod and a chamber formed by the hydraulic cylinder, the inner cylinder rod and the piston at the second end.

DETAILED DESCRIPTION

Figure 2:
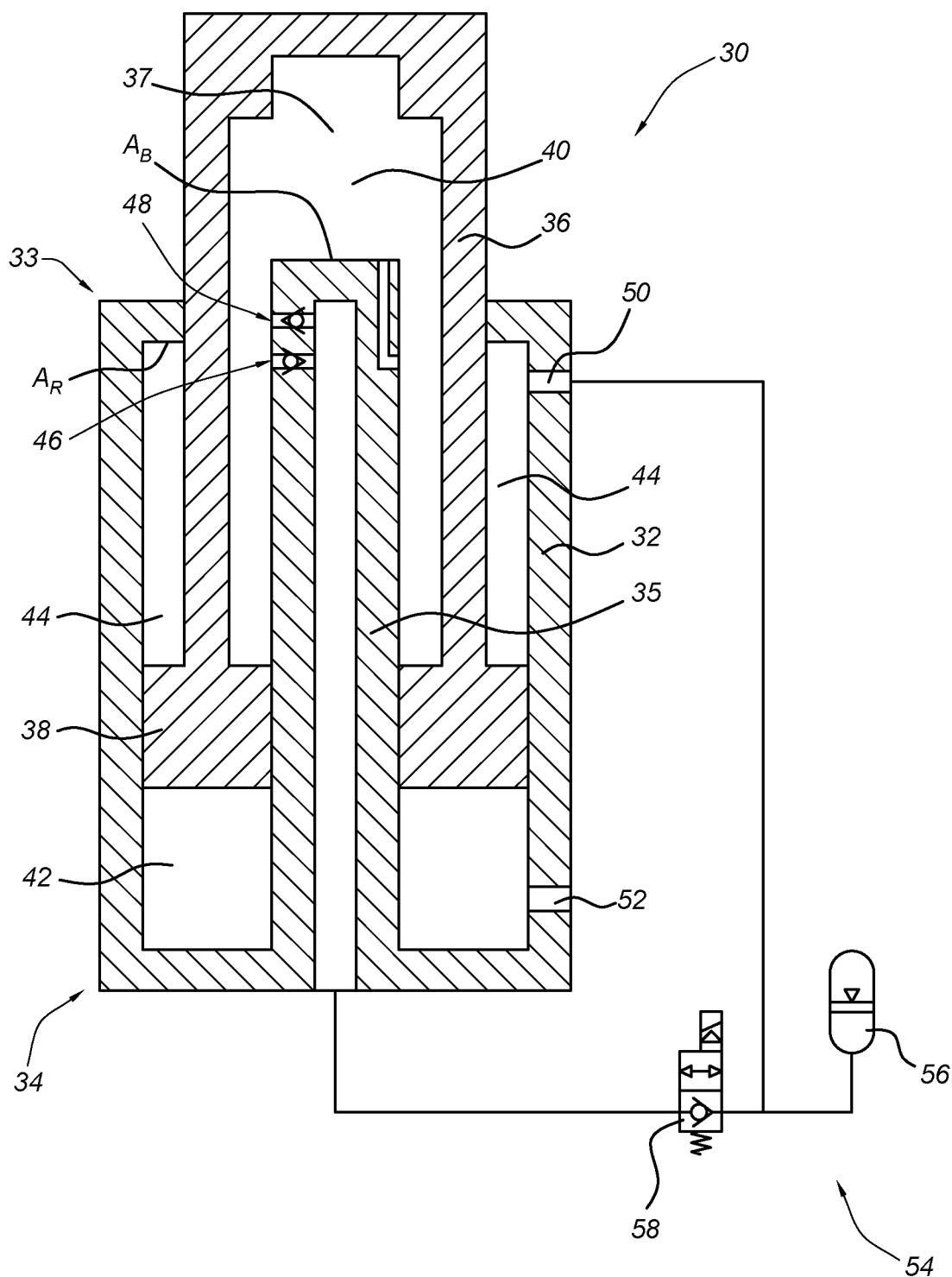
FIG. 2 schematically illustrates a first embodiment of a compensator device.

FIG. 2 schematically illustrates a first embodiment of a compensator device 30 which can be used, for example, as part of a swell compensation system. Compensator device 30 is designed to allow for higher compensation pressures to be used, and therefore smaller components while reducing or eliminating risks of damage to the device in extreme situations, such as a wire breaking when compensator device 30 is used as part of a swell compensation system.

Compensator device 30 includes cylinder 32 with first end 33, second end 34 and inner cylinder rod 35; and piston rod 36 with hollow cavity 37 and piston 38. Cylinder 32 with inner cylinder rod 35 and piston rod 36 with piston 38 together form first pressure chamber 40, second pressure chamber 42 and third pressure chamber 44.

First pressure chamber 40 is formed in hollow cavity 37 of piston rod 36 between an inner side of piston rod 36 and an outer side of inner cylinder rod 35 on first end 33. Second pressure chamber 42 is formed between the inner side of cylinder 32 and piston 38 at second end 34. Third pressure chamber 44 is formed between the inner side of cylinder 32, the outer side of piston rod 36 and piston 38 at first end 33.

Inner cylinder rod 35 extends from second end 34 of cylinder 32 and includes inlet valve 46, outlet valve 48 and upper surface area $A_B$. Inlet valve 46 is positioned such that piston 38 can block valve 46 when it moves sufficiently axially toward first end 33. Cylinder 32 includes a fluid passage 50 connecting to third pressure chamber 44 and fluid passage 52 connecting to second pressure chamber 42. Also shown is pressure system 54 with pressure vessel 56 and valve 58.

Piston rod 36 is hollow inside, and piston 38 is annular shaped extending from an outer side of inner cylinder rod 35 to an inner side of cylinder 32. Piston rod 36 extends axially into cylinder 32 from first end 33 and can move piston 38 axially within cylinder 32. This movement is influenced by pressure system 54 which connects to first pressure chamber 40 through valve 46 and to third pressure chamber 44 through fluid passage 50.

Figure 1:
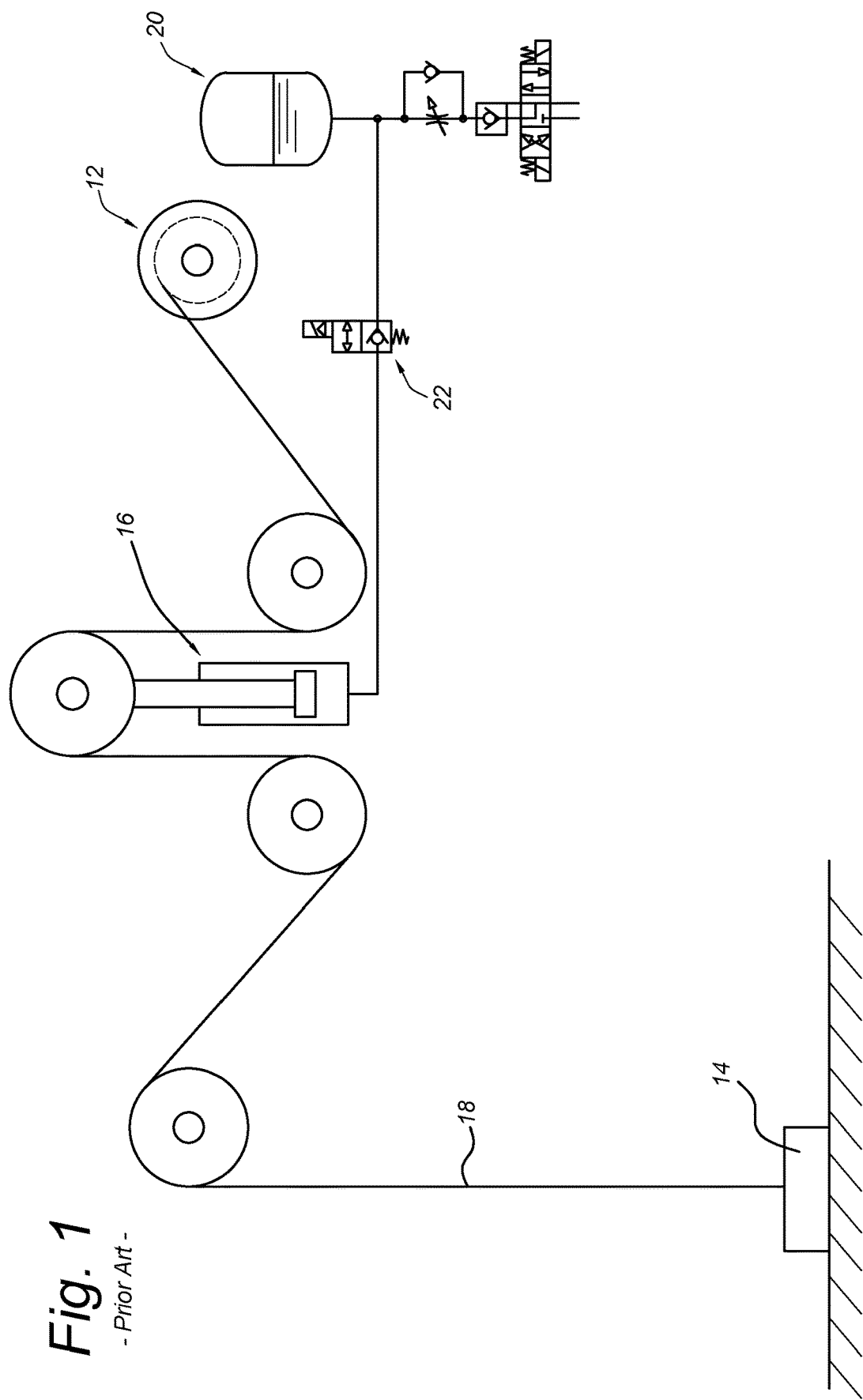
FIG. 1 schematically illustrates a prior art swell compensator system.

Compensator device 30 can be part of a swell compensation system, such as that shown in FIG. 1 (replacing compensator 16). As a part of such a system, typically, a load would be placed on piston rod 36 or cylinder 32. Pressure system 54 works to make sure that there is sufficient pressure in compensator device 30 to compensate the forces on the system due to external movement(s) (e.g., a wave). Pressure system 54 provides pressurized fluid to first pressure chamber 40 (through valve 46) which acts on the surface area $A_B$ of inner cylinder rod 35. Pressure system 54 also provides pressurized fluid to third pressure chamber 44 (through fluid passage 50) which acts on the inner surface area $A_R$ of first end 33 of cylinder 32. Thus, the effective compensation surface $A_C$ area on cylinder 32 (for compensation pressure) is equal to the difference between these two areas ($A_C = A_B - A_R$).

The blocking area $A_B$ for compensator device 30 is the end of inner cylinder rod 35. Blocking area $A_B$ is shaped to fit into an inner receiving portion of piston rod 36 in the embodiment in FIG. 2, though it may not be in other embodiments. The fit between blocking area $A_B$ and the inner receiving portion of piston rod 36 can help to provide cushioning at the end of an inward stroke. The blocking area $A_B$ is generally subject to blocking forces when a maximum load is place on piston rod 36 and piston 38, for example when a winch is using maximum pulling force if compensator device 30 is used in such a system shown in FIG. 1 (replacing compensator 16). As blocking area $A_B$ of compensator device 30 is always larger than the compensation area $A_C$ ($A_C = A_B - A_R$) in compensator device 30, it is possible to use a higher compensation pressure without increasing blocking pressure. Additionally, the blocking area $A_B$ and compensation area $A_C$ are designed in this embodiment to avoid buckling of the piston rod under high forces even in systems where the components are very small.

In past systems such as that shown in FIG. 1, the pushing force delivered to a cylinder was limited due to the possibility of buckling the piston rod if the diameter was too small and/or the force was too high. Thus, such systems required large piston rod diameters to prevent buckling and therefore low compensation forces to cope with maximum winch pulling force, which may be two to three times higher than the compensation force. By forming compensator device 30 with inner cylinder rod 35 with blocking diameter $A_B$, and making compensation area be a reduced function of this blocking area, larger piston rod 36 is able to handle higher compensation pressures and resist buckling. The ability to use higher compensation pressure in compensator device 30 allows for the use of smaller components as the higher compensation pressure means smaller active surface areas and therefore smaller oil flows, even for small cylinders 32 in which buckling may otherwise be a problem.

Low pressures and large equipment were also used in past systems to attempt to prevent damage to the cylinder in the case of a wire breaking. This larger equipment resulted in high costs. In the case of a wire breaking (or other similar unexpected event), piston rod 36 and piston 38 extend at high speeds as the force counteracting the compensation pressure is removed. Based on the compensation pressure used, this has the potential to severely damage cylinder 32, particularly when piston 38 hits first end 33 of cylinder 32. As discussed in the background, past systems used a blocking valve (such as valve 22) to quickly shut off flow to the cylinder. However, the valve was not always quick enough to be effective and did not always stop the movement of the cylinder, with the cylinder instead simply drawing a vacuum. Other past systems used a cushioning device on the rod side of the system, though this had problems relating the difficulties of properly deaerating the cylinder to ensure that the cushioning worked properly.

Compensator device 30 is designed to inherently provide dual methods of decelerating extension of cylinder 32 and piston rod 36 with piston 38, thereby reducing the chances of damage to compensator device 30 or other nearby systems. Firstly, inlet valve 46 to first pressure chamber 40 (which normally provides pressure to first pressure chamber 40) is positioned such that when piston rod 36 extends to a certain point toward first end 33 of cylinder 32, piston 38 blocks inlet valve 46, causing the pressure in first pressure chamber 40 to throttle down to zero. Secondly, third pressure chamber 44 still receives pressurized fluid from pressurization system 54, and this pressure works to decelerate the movement of piston rod 36 and piston 38 towards first end 33 of cylinder 32, providing an additional inherent safety feature.

Figure 3:
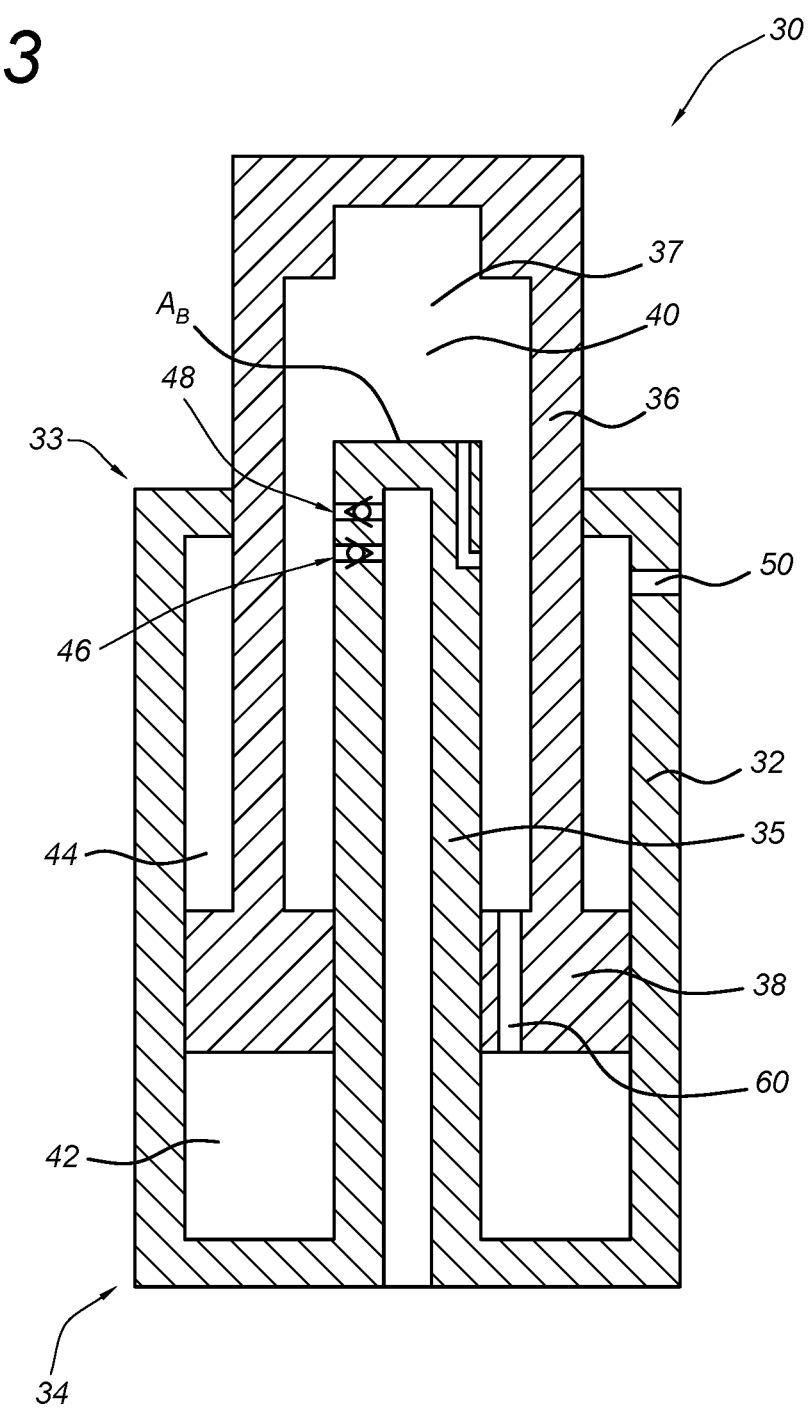
FIG. 3 schematically illustrates a second embodiment of a compensator device.

FIG. 3 schematically illustrates a second embodiment of a compensator device 30, with cylinder 32 with first end 33, second end 34 and inner cylinder rod 35 (with upper surface area $A_B$), and piston rod 36 with hollow cavity 37 and piston 38; first pressure chamber 40, second pressure chamber 42, third pressure chamber 44, inlet valve 46, outlet valve 48, fluid passage 50 and fluid passage 60.

This embodiment is configured much like that shown in FIG. 2, except that a fluid passage 60 is added to piston 38 connecting first pressure chamber 40 with second pressure chamber 42. The embodiment also works in much the same manner as the embodiment of FIG. 2, by having a blocking area $A_B$ that is larger than the compensation area $A_C$ to allow the use of higher compensation pressures.

In the embodiment of FIG. 3, the piston rod diameter is sufficient to prevent buckling, thereby allowing for the connection between first pressure chamber 40 and second pressure chamber 42 through passage 60. Such a system is desirable for compensation systems where there is sufficient space for larger components (to avoid the risk of buckling).

In summary, by forming compensator device 30 with a hollow piston rod 36 and an inner cylinder 35, compensator device 30 is able to work with higher compensation pressures and forces without the need for large equipment to prevent damage to compensator device 30 and/or surrounding equipment. Using end of inner cylinder rod 35 as blocking area $A_B$, and arranging pressure chambers 40, 42, 44 so that compensation pressure area $A_C$ ($A_C=A_B-A_R$) is smaller than blocking area $A_B$ in compensator device 30, it is possible to use a higher compensation pressures independent of the blocking force. This allows for the use of smaller components for compensator device 30 while reducing or eliminating the risk of damage by buckling, thereby reducing costs. In systems where buckling is not an issue based on the piston rod diameter, a passage 60 can be formed in piston 38, connecting pressure chambers 40 and 42, making the full bore surface used for blocking and the full rod surface used for compensation.

Additionally, compensator device 30 with hollow piston rod 36 and inner cylinder 35 is able to better handle an unexpected loss of load, for example a wire breaking, by providing dual inherent methods of decelerating the cylinder. Pressure in third pressure chamber 44 helps to decelerate movement of piston rod 36 and piston, while placement of inlet valve 46 ensures that piston 38 will block valve 46 at a certain point, thereby causing the pressure pushing piston rod 38 in an extension direction to reduce down to zero.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A compensator device comprising:
   a hydraulic cylinder with a first end, a second end and an inner cylinder rod extending axially from the second end, the inner cylinder rod with an end with a blocking diameter;
   a piston rod with a piston moveable axially within the cylinder, the piston rod being generally hollow and with a cavity to receive the blocking diameter of the inner cylinder rod;
   a first pressure chamber formed in the hollow cavity of the piston rod between the piston, the inner cylinder rod and an inner side of the piston rod;
   a second pressure chamber formed between an inner side of the cylinder at the second end and the piston;
   a third pressure chamber formed between the inner side of the cylinder at the first end, the outer side of the piston rod and the piston;
   an inlet valve included in the inner cylinder rod in fluid communication with the first pressure chamber and positioned to be selectively covered by the piston when the piston moves toward the first end of the cylinder;
   an outlet valve included in the inner cylinder rod, and in fluid communication with the first pressure chamber for allowing fluid to exit the first pressure chamber, wherein the outlet valve is a one-direction valve;
   a fluid passage connecting to the third pressure chamber; and
   a pressure system to selectively provide pressurized fluid to the first pressure chamber for influencing movement of the piston rod and piston axially with respect to the cylinder.

2. The compensator device of claim 1, wherein the pressure system comprises:
   a pressure vessel connected to the first pressure chamber and the third pressure chamber for selectively providing a pressurized fluid to the first pressure chamber.

3. The compensator device of claim 1, wherein the inlet valve is a one-direction valve.

4. The compensator device of claim 1, and further comprising:
   a valve to selectively block inward movement of the hydraulic cylinder.

5. The compensator device of claim 1, and further comprising a flow passage in the piston extending from the first pressure chamber to the second pressure chamber.

6. A swell compensation system with a compensator device according to claim 1.

7. A method of forming a compensator device, the method comprising:
   forming a hydraulic cylinder with a first end and a second end;
   forming an inner cylinder rod with an end with a blocking area, the inner cylinder rod being formed to extend axially within the hydraulic cylinder from the second end;
   forming a piston rod and piston, the piston rod with a generally hollow interior and with a cavity to receive the blocking area of the inner cylinder rod;
   connecting the piston rod and piston through the first end of the hydraulic cylinder so that the piston rod and the piston can move axially in the hydraulic cylinder; and
   forming an inlet valve and an outlet valve in fluid communication with the hollow interior of the piston rod, the inlet valve positioned in the inner cylinder rod such that the piston will cover the inlet valve when it has moved a certain distance toward the first end of the hydraulic cylinder, wherein the outlet valve is included in the inner cylinder rod and is a one-direction valve.

8. The method of claim 7, and further comprising:
connecting a pressurization system to the inlet valve to selectively provide pressurized fluid to the inlet valve; and
connecting the pressurization system to a pressure chamber formed between an inner side of the hydraulic cylinder first end, an outer side of the piston rod and the piston.

9. The method of claim 8, and further comprising:
forming a fluid passage through the piston between the hollow interior of the piston rod and a chamber formed by the hydraulic cylinder, the inner cylinder rod and the piston at the second end.

10. A compensator device comprising:
a hydraulic cylinder with a first end, a second end and an inner cylinder rod extending axially from the second end, the inner cylinder rod with an end with a blocking diameter;
a piston rod with a piston moveable axially within the cylinder, the piston rod being generally hollow and with a cavity to receive the blocking diameter of the inner cylinder rod;
a valve to selectively block inward movement of the hydraulic cylinder; and
an inlet valve and an outlet valve in fluid communication with the hollow interior of the piston rod, the inlet valve positioned in the inner cylinder rod such that the piston will cover the inlet valve when the piston has moved a certain distance toward the first end of the hydraulic cylinder, wherein the outlet valve is included in the inner cylinder rod and is a one-direction valve.

11. The compensator device of claim 10, and further comprising:
a pressurization system connected to the inlet to selectively provide pressurized fluid to the inlet.

* * * * *